United States Patent
Lowe et al.

(10) Patent No.: US 11,544,832 B2
(45) Date of Patent: *Jan. 3, 2023

(54) DEEP-LEARNED GENERATION OF ACCURATE TYPICAL SIMULATOR CONTENT VIA MULTIPLE GEO-SPECIFIC DATA CHANNELS

(71) Applicant: Rockwell Collins, Inc., Cedar Rapids, IA (US)

(72) Inventors: Daniel J. Lowe, Sandy, UT (US); Rishabh Kaushik, Salt Lake City, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/781,789

(22) Filed: Feb. 4, 2020

(65) Prior Publication Data
US 2021/0241440 A1    Aug. 5, 2021

(51) Int. Cl.
*G06T 11/00*    (2006.01)
*G06T 7/00*    (2017.01)
(Continued)

(52) U.S. Cl.
CPC ......... *G06T 7/0002* (2013.01); *G06N 3/0454* (2013.01); *G06N 3/08* (2013.01);
(Continued)

(58) Field of Classification Search
None
See application file for complete search history.

(56) References Cited

U.S. PATENT DOCUMENTS

| 5,309,522 | A | 5/1994 | Dye |
| 7,724,965 | B2 | 5/2010 | Aguera y Arcas |
| | | (Continued) | |

FOREIGN PATENT DOCUMENTS

WO    2017066679 A9    4/2017

OTHER PUBLICATIONS

Kniaz, Conditional GANs for Semantic Segmentation of Multispectral Satellite Images, 2018, SPIE Remote Sensing (Year: 2018).*
(Continued)

*Primary Examiner* — Anh-Tuan V Nguyen
(74) *Attorney, Agent, or Firm* — Suiter Swantz pc llo

(57) ABSTRACT

A simulator environment is disclosed. In embodiments, the simulator environment includes graphics generation (GG) processors in communication with one or more display devices. Deep learning neural networks running on the GG processors are configured for run-time generation of photorealistic, geotypical content for display. The DL networks are trained on, and use as input, a combination of image-based input (e.g., imagery relevant to a particular geographical area) and a selection of geo-specific data sources that illustrate specific characteristics of the geographical area. Output images generated by the DL networks include additional data channels corresponding to these geo-specific data characteristics, so the generated images include geotypical representations of land use, elevation, vegetation, and other such characteristics.

8 Claims, 2 Drawing Sheets

(51) Int. Cl.
  *G06N 3/04* (2006.01)
  *G06N 3/08* (2006.01)
  *G09B 9/30* (2006.01)
(52) U.S. Cl.
  CPC .. *G06T 11/001* (2013.01); *G06T 2207/10032* (2013.01); *G06T 2207/10048* (2013.01); *G06T 2207/20084* (2013.01); *G06T 2207/30184* (2013.01); *G09B 9/302* (2013.01)

(56) References Cited

U.S. PATENT DOCUMENTS

| | | | |
|---|---|---|---|
| 7,983,474 B2 | 7/2011 | Van Workum et al. | |
| 8,379,016 B2 | 2/2013 | Ingersoll et al. | |
| 8,625,890 B1* | 1/2014 | Brenner | 382/173 |
| 9,347,792 B2 | 5/2016 | Meeker et al. | |
| 10,424,111 B2 | 9/2019 | Stacey | |
| 10,430,682 B2 | 10/2019 | Venkataraman et al. | |
| 10,824,909 B2* | 11/2020 | Ros Sanchez | G06V 10/82 |
| 2003/0184563 A1* | 10/2003 | Wiant, Jr. | G01C 23/00 |
| | | | 345/629 |
| 2007/0078695 A1* | 4/2007 | Zingelewicz | G06Q 10/06 |
| | | | 705/7.28 |
| 2007/0226004 A1* | 9/2007 | Harrison | G09B 29/007 |
| | | | 705/26.1 |
| 2008/0131029 A1 | 6/2008 | Coleby et al. | |
| 2009/0271160 A1* | 10/2009 | Copenhagen | G09B 9/00 |
| | | | 703/6 |
| 2010/0060661 A1* | 3/2010 | Avent | A63F 13/577 |
| | | | 345/619 |
| 2011/0304541 A1* | 12/2011 | Dalal | G06F 3/017 |
| | | | 345/158 |
| 2015/0138078 A1* | 5/2015 | Krupka | G06K 9/4647 |
| | | | 345/156 |
| 2015/0227808 A1* | 8/2015 | Zharkov | G06K 9/4638 |
| | | | 345/441 |
| 2015/0327766 A1* | 11/2015 | Gupta | G06T 7/0081 |
| | | | 382/128 |
| 2016/0078640 A1* | 3/2016 | Sheppard | H04N 21/47205 |
| | | | 345/538 |
| 2016/0232256 A1* | 8/2016 | Lokitz | G06F 30/00 |
| 2017/0061625 A1* | 3/2017 | Estrada | G06N 3/0454 |
| 2018/0247416 A1* | 8/2018 | Ruda | G06T 7/0004 |
| 2018/0293439 A1* | 10/2018 | Slesarev | G06K 9/00637 |
| 2019/0049987 A1* | 2/2019 | Djuric | G06K 9/6288 |
| 2019/0147321 A1* | 5/2019 | Miyato | G06N 20/00 |
| | | | 382/157 |
| 2019/0228571 A1 | 7/2019 | Atsmon | |
| 2020/0033866 A1 | 1/2020 | Song et al. | |
| 2020/0057824 A1* | 2/2020 | Yeh | G06N 3/04 |
| 2020/0364910 A1* | 11/2020 | Price | G06V 10/443 |
| 2021/0012162 A1* | 1/2021 | Huang | G06N 3/0427 |
| 2021/0158815 A1* | 5/2021 | Lee | G06V 10/82 |
| 2021/0178274 A1* | 6/2021 | St-Pierre | A63F 13/52 |

OTHER PUBLICATIONS

Ganguli et al., GeoGAN: A Conditional GAN with Reconstruction and Style Loss to Generate Standard Layer of Maps from Satellite Images, 2019, Stanford University (Year: 2019).*

Extended Search Report for European Application No. 21154801.1 dated Jul. 2, 2021, 12 pages.

Spick Ryan et al: "Realistic and Textured Terrain Generation using GANs", European Conference on Visual Media Production, [Online] Dec. 17, 2019 (Dec. 17, 2019), pp. 1-10, XP055810695, New York, NY, USA DOI: 10.1145/3359998.3369407 ISBN: 978-1-4503-7003-5 Retrieved from the Internet: URL:https://dl.acm.org/doi/pdf/10.1145/335 9998.3369407>.

* cited by examiner

DEEP-LEARNED GENERATION OF ACCURATE TYPICAL SIMULATOR CONTENT VIA MULTIPLE GEO-SPECIFIC DATA CHANNELS

CROSS-REFERENCE TO RELATED APPLICATIONS

The instant application is related to concurrently filed and commonly owned U.S. patent application Ser. No. 16/781,769. Said U.S. patent application Ser. No. 16/781,769 is hereby incorporated by reference in its entirety.

BACKGROUND

Flight simulators need to generate, in real time or near real time, photorealistic terrain content for the whole Earth for optimally accurate simulation. Terrain generation may be achieved via deep learning (DL) neural networks. However, while these DL neural networks may be extensively trained before being utilized, the training data is conventionally limited to geographical information characteristic of a map application. Accordingly, the DL neural networks may not be trained to generate accurate geotypical content fully representative of the terrain they purport to simulate.

SUMMARY

A simulator environment is disclosed. In embodiments, the simulator environment includes graphics generation (GG) processors and deep learning (DL) neural networks running on the GG processors. The DL neural networks receive as input captured images of a location as well as geo-specific datasets associated with specific characteristics of the location. By correlating the geo-specific data to the image input, the DL neural networks are trained to generate output images wherein each pixel includes not only color channels, but geo-specific data channels indicating location characteristics to be geotypically portrayed within the output image.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
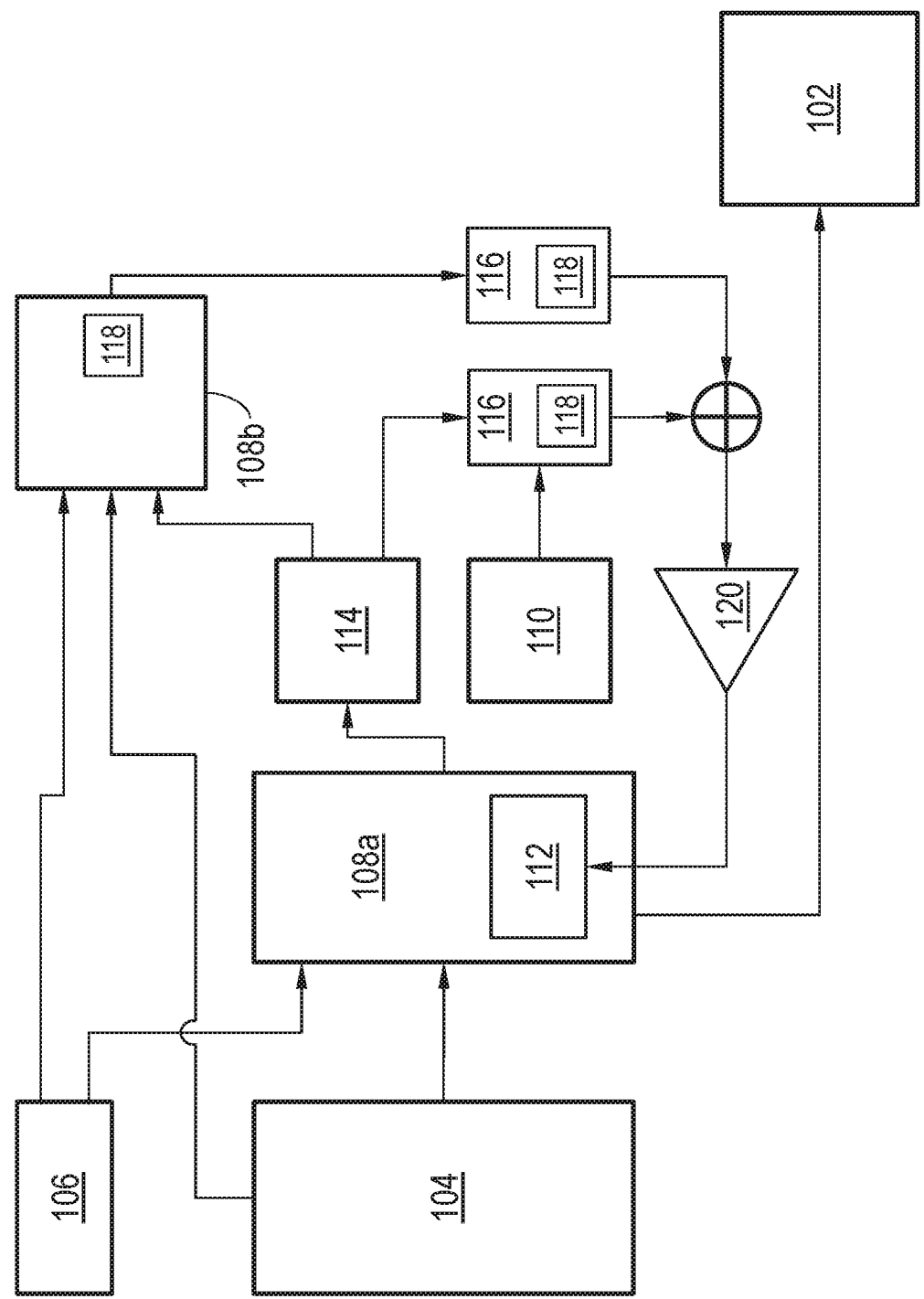
FIG. 1 is a block diagram illustrating a simulator environment in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a simulator environment 100 is disclosed.

In embodiments, the simulator environment 100 may incorporate conditional generative adversarial networks (cGAN) for run-time generation of photorealistic geographically typical content 102 (e.g., for display by a display device within, or remotely located from, the simulator) based on a variety of geo-specific datasets 104 in addition to, or instead of, conventional image-based input 106 (e.g., color imagery of a geographic area). For example, conventional cGAN may provide for only three data channels, e.g., three color values (red/green/blue, or RGB) per pixel (or, for example, only one color value per pixel for monochrome images).

In embodiments, the simulator environment 100 may incorporate multi-stage deep learning cGAN including generator networks 108a and discriminator networks 108b. The generator networks 108a and discriminator networks 108b may incorporate multiple data channels in order to utilize, both as training data and as input for the run-time generation of photorealistic geographically typical content 102, multiple geo-specific datasets 104.

In embodiments, the generator networks 108a and discriminator networks 108b may be extensively trained on a combination of image-based input 106 and geo-specific datasets 104. For example, based on image-based input 106 corresponding to a particular geographical area (e.g., an overhead view of one square kilometer (~0.39 sq mi) of the Earth's surface) and multiple geo-specific datasets 104 corresponding to that square kilometer, the generator networks 108a may be trained to achieve a desired output 110 (e.g., a ground truth image) by generating, based on a set of weights and biases (112), a series of output images 114. While neither the desired output 110 nor the output images 114 may precisely duplicate the geographical area corresponding to the inputs (e.g., the precise natural features and/or manmade landmarks in their precise locations within the square kilometer), the desired output 110, and ideally the output images 114, will include photorealistic content that is geo-typical, or appropriate in light of what the generator networks 108a can discern about the geographical area based on the image-based input 106 and/or geo-specific datasets 104. For example, the desired output 110 may generally depict structures and roadways where these features should be located. Similarly, any vegetation, fauna, or foliage may be appropriate to any biomes and/or land use indicated by the geo-specific datasets 104 (e.g., forests, pastures, bodies of water, and shorelines may be generally depicted but accurately located within the images).

In embodiments, the output images 114 generated by the generator networks 108a may be evaluated by the discriminator networks 108b for accuracy; essentially, the generator networks try to fool the discriminator networks by iterating higher quality output images via a cyclical process, until the discriminator networks see the output images as authentic, or as equivalent to the desired output 110. For example, the discriminator networks 108b may have access to the image-based input 106 and geo-specific datasets 104, as well as the desired output 110. The quality of the output images 114 (e.g., as compared (116) to the desired output 110) may be measured by the discriminator networks 108b via loss functions 118. The loss functions 116 may be optimized (120) and used by the generator networks 108a to revise its weights and biases 112 and thereby generate higher quality output images 114. When the generator networks 108a are sufficiently trained to consistently produce output images 114 evaluated as authentic by the discriminator networks 108b, the generator networks 108a may also be capable of run-time generation (e.g., in real time or near real time) of photorealistic geotypical content 102. For example, if a simulator device is simulating level flight over changing terrain (e.g., incorporating urban, rural, coastal, littoral areas and/or combinations thereof), the generator networks 108a may generate for display by the simulator photorealistic representations (102) of the terrain with sufficient speed as to appear realistic to the simulator user and including sufficiently geotypical content (e.g., vegetation, bodies of water, manmade structures, border areas) to accurately portray the varied characteristics of the terrain.

Figure 2:
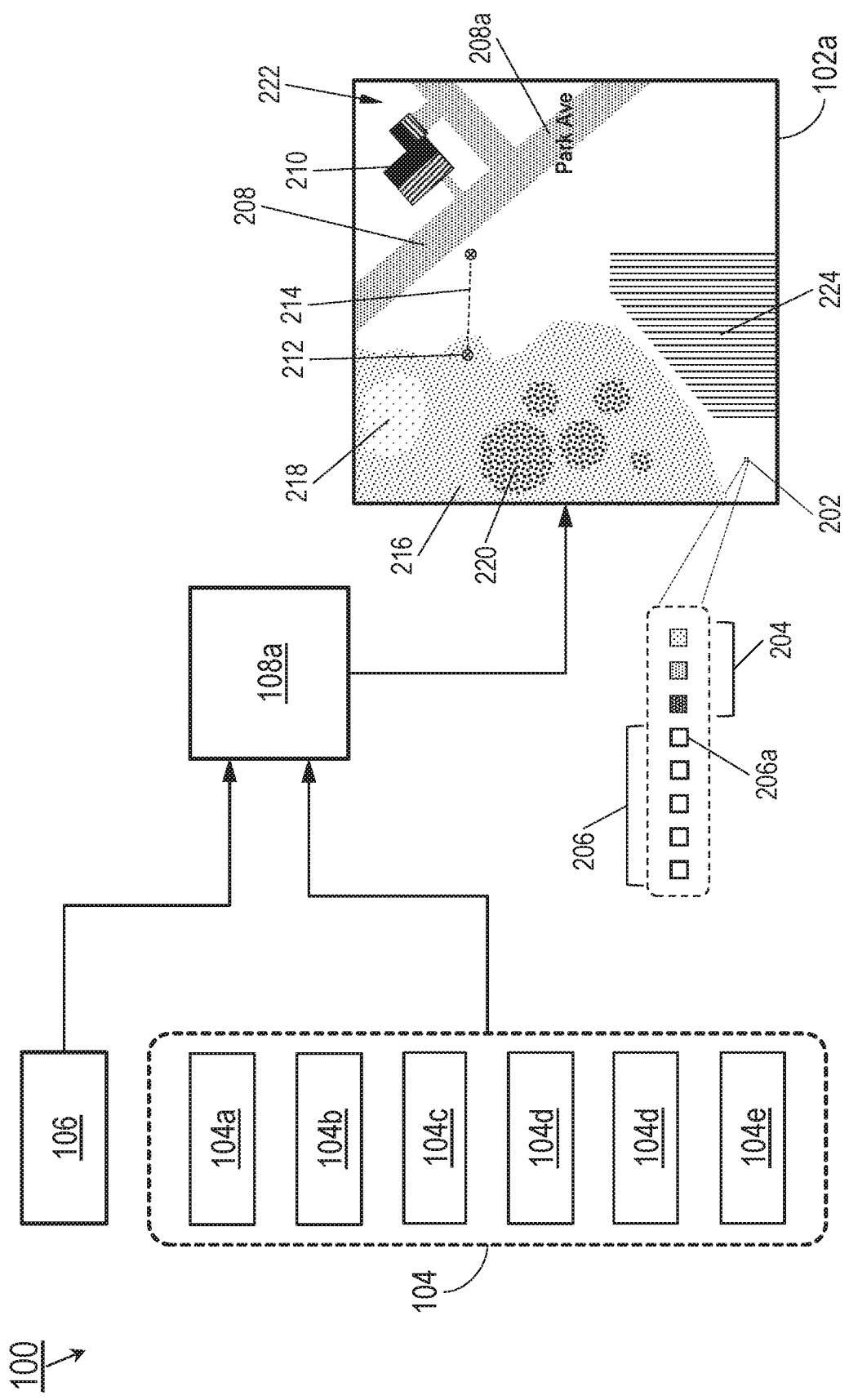
FIG. 2 is a diagrammatic illustration of operations of the simulator environment of FIG. 1.

Referring to FIG. 2, the simulator environment 100 is shown.

In embodiments, geo-specific datasets 104 may include diverse data structures or sources covering a common geographical area or universe, e.g., the whole Earth or any appropriate subset thereof. For example, the incorporation of geo-specific datasets 104 may train the generator networks 108a and discriminator networks (108b, FIG. 1) to produce and recognize photorealistic content (e.g., for use in lieu of actual satellite-based images or other photographic imagery) that places natural features and manmade landmarks (e.g., roads, structures, vegetation) in geographically correct locations, but renders the features and landmarks using typical-looking content.

In embodiments, the geo-specific datasets 104 may be selected for their ability to enhance the ability of the generator networks 108a (as well as the discriminator networks 108b, in their capacity to evaluate image content produced by the generator networks) to identify specific types of content within the image-based input 106 and thereby generate photorealistic geotypical output images 102a wherein, e.g., individual elements are both geotypically represented and accurately located within the image. For example, the geo-specific datasets 104 may include, but are not limited to, geographical vector data 104a (e.g., geographical information about roads, waterways, buildings, and other natural features and manmade landmarks); elevational terrain data 104b (e.g., elevation grid posts enabling the generation of an accurate terrain slope); ecological data 104c (e.g., biome data indicating the locations of deserts, mountains, forests, and other naturally occurring habitats, flora, and fauna); infrared (IR) or near-infrared (NIR) imagery 104d (e.g., indicating the presence of foliage); land-use data 104e (e.g., whether parcels of land are used or zoned for industrial, urban, residential, or agricultural use); and a target resolution 104f for the generated output images 102a.

Accordingly, in embodiments the output images 102a generated by the trained generator networks 108a may comprise a pixel set according to the desired target resolution 104f. For example, each individual pixel 202 within the generated output images 102a may incorporate multiple color channels 204 (e.g., red, green, and blue (RGB) color channels). Further, each individual pixel 202 may include additional geo-specific data channels 206, each individual geo-specific data channel 206 tied to a geo-specific dataset 104a-e that determines the individual characteristics of the geographical location represented by each individual pixel or group thereof. The generator networks 108a may generate each individual pixel 202 or group thereof according to a set of characteristics identified by the geo-specific data channels 206, and accordingly may position specific and typical image elements within the generated output images 102a based on the corresponding characteristics of the represented location.

In embodiments, the generated output images 102a may comprise an overhead view of a mixed-use geographical area. For example, based on geographical vector data 104a (and, e.g., corresponding geo-specific data channel 206a), the generated output images 102a may geotypically locate streets and roadways 208 as well as residences 210 and other structures located thereon. In some embodiments, the portrayed streets 208 may include identifying labels 208a. In some embodiments, based on elevational terrain data 104b, the generated output images 102a may geotypically portray grid points 212 of known elevation and any slope 214 therebetween. In some embodiments, based on ecological data 104c, the generated output images 102a may typically portray forested areas 216, bodies of water, grasslands, wetlands, or any other appropriate biomes. Further, the ecological data 104c may include climatic data specific to the portrayed location, such that (e.g., if the generated photorealistic geotypical image content 102 is meant to represent a wintertime image) the generated photorealistic geotypical image content may include patches of snow 218. In some embodiments, based on IR/NIR imagery 104d, the generated output images 102a may include typical representations of trees 220, bushes, shrubs, and other foliage in appropriate locations. Similarly, based on land-use data 104e, the generated output images 102a may include typical representations of residential areas 222, agricultural land 224, industrial areas, and other examples of developed or undeveloped land.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A simulator environment, comprising:
    one or more graphics generation (GG) processors;
    one or more conditional generative adversarial network (cGAN) deep learning (DL) neural networks configured to execute on the GG processors, the one or more cGAN DL neural networks configured to:
        receive one or more inputs comprising:
            four or more input channels comprising:
                three or more different color input channels associated with three or more different colors of pixels of at least one overhead view input image corresponding to a location; and
                at least one geo-specific data input channel associated with one or more geo-specific datasets corresponding to the location, each of the one or more geo-specific datasets associated with one or more characteristics of the location, wherein the one or more characteristics includes foliage;
        generate, based on the four or more input channels of the one or more inputs, at least one overhead view output image comprising a set of pixels, each pixel corresponding to four or more output channels comprising:
            three or more color output channels associated with three or more different color values; and
            a geo-specific data channel associated with at least one characteristic of the one or more characteristics,
        wherein the one or more geo-specific datasets include at least one of:
            infrared imagery data configured to be used to generate foliage in the output image; or
            near-infrared imagery data configured to be used to generate foliage in the output image;
            wherein at least a portion of a light spectrum range of the at least one of the infrared imagery data or the near-infrared imagery data is different than a light spectrum range of the at least one output image.

2. The simulator environment of claim 1, wherein the one or more cGAN DL neural networks are configured to generate at least one evaluation of the at least one overhead view output image based on the input image, a desired output, and the one or more geo-specific datasets.

3. The simulator environment of claim 2, wherein the one or more cGAN DL neural networks are configured to:
    generate the at least one overhead view output image based on one or more of a weight and a bias; and
    adjust at least one of the weight and the bias based on the at least one evaluation.

4. The simulator environment of claim 1, wherein the one or more geo-specific datasets further include elevational data corresponding to the location.

5. The simulator environment of claim 1, wherein the one or more geo-specific datasets further include at least one of ecological data and climatic data corresponding to the location.

6. The simulator environment of claim 1, wherein the one or more geo-specific datasets further include land-use data corresponding to the location.

7. The simulator environment of claim 1, wherein:
    the simulator environment includes a flight simulator configured to simulate an airborne vehicle; and
    the one or more DL networks are configured for run-time generation of the at least one output image.

8. The simulator environment of claim 1, further comprising:
    at least one display device in communication with the GG processors, the display device configured to display the at least one output image.

* * * * *